US000001546H

United States Statutory Invention Registration [19]

[11] Reg. Number: H1546

[45] Published: Jun. 4, 1996

Walker, Jr.

[54] SOLID POLYMER ELECTROLYTE AND ELECTROCHEMICAL CELL INCLUDING SAID ELECTROLYTE

[75] Inventor: Charels W. Walker, Jr., Neptune, N.J.

[73] Assignee: The United States of America as represented by the Secretary of the Army, Washington, D.C.

[21] Appl. No.: 39,601

[22] Filed: Mar. 16, 1993

[51] Int. Cl.[6] ..... H01M 6/18

[52] U.S. Cl. ..... 429/191; 429/192; 429/218; 429/219; 429/220; 429/221; 429/223; 429/224

[58] Field of Search ..... 204/295, 296; 429/191, 192, 213, 218, 220, 221, 223, 219, 224

[56] References Cited

U.S. PATENT DOCUMENTS 5,143,805 9/1992 Anderman et al. ..... 429/217

5,183,715 2/1993 North ..... 429/192

*Primary Examiner*—Charles T. Jordan
*Assistant Examiner*—John R. Hardee
*Attorney, Agent, or Firm*—Michael Zelenka; Roy E. Gordon

[57] ABSTRACT

A solid polymer electrolyte is provided including a solid solution of a lithium salt such as $LiCF_3SO_3$ in a polymer host such as poly(ethylene oxide). The electrolyte also includes a small amount of a plasticizing agent such as bis(2 ethylhexyl) sebacate. The electrolyte can be used to make a solid state electrochemical cell.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOLID POLYMER ELECTROLYTE AND ELECTROCHEMICAL CELL INCLUDING SAID ELECTROLYTE

GOVERNMENT INTEREST

The invention described herein may be manufactured, used, and licensed by or for the Government for governmental purposes without the payment to me of any royalties thereon.

FIELD OF INVENTION

The invention relates to solid, ionically conductive polymers and to their use as electrolytes in electrochemical cells.

BACKGROUND OF THE INVENTION

Solid polymer electrolyte (SPEs) containing dissolved metal salts have been proposed as an alternative to liquid electrolytes in rechargeable electrochemical devices. There are many advantages to using a solid electrolyte, such as the capability for high speed production of thin cells constructed in a bipolar arrangement. Further, the electrolyte can act as a mechanical separator between the anode and cathode, eliminating the need for an inert porous separator, as well as acting as a binder/adhesive to move and conform to electrode volume changes during cycling. Because the system would be all solid state, cells of any desired geometric shape would be possible. There is also a safety advantage in that if the integrity of the sealed cell package is broken, there is no liquid to leak out.

One polymer system of interest is based on high molecular weight poly(ethylene oxide), HO—$CH_2$ $CH_2$(O—$CH_2$ $CH_2)_n$OH. An ionically solid polymer electrolyte can be prepared by dissolving PEO and an appropriate salt in a suitable volatile solvent such as acetonitrile. By solution casting, acetonitrile is removed by evaporation, leaving a free standing, solid, flexible film of good mechanical strength that contains only PEO with dissolved salt. Such films are ionic conductors. Unfortunately, at room temperature, these PEO films are highly crystalline so ionic conductivity is poor ($\approx 10^{-7} Scm^{-2}$) rendering PEO as an impractical electrolyte at these temperatures.

SUMMARY OF THE INVENTION

The general object of this invention is to provide a solid, ionically conductive polymer that can be used as an electrolyte in electrochemical cells. A more particular object of the invention is to improve the ionic conduction of a typical host polymer such as PEO with a dissolved lithium salt such as $LiClO_4$, $LiBF_4$, $LiCF_3SO_3$, or $LiAsF_6$ so that it can be used as an electrolyte in a solid state electrochemical cell.

It has now been found that the aforementioned objects can be attained by the addition of a plasticizing agent to increase the amorphous character of the polymer host and thereby enable increased ionic conductivity. One such material found to act as an effective plasticizer for PEO is bis (2 ethylhexyl) sebacate, or "dioctyl" sebacate. The addition of dioctyl sebacate to $(PEO)_{20}(LiCF_3SO_3)$, causes an immediate increase in ionic conductivity between room temperature, RT and the melting temperature of (PEO), $T_m$. The increase is equal to or greater than that observed by temperature-cycled polymer without dioctyl sebacate. In polymer containing dioctyl sebacate, conductivities for first (temperature) cycle and subsequent cycles are indistinguishable.

DESCRIPTION OF THE DRAWING AND THE PREFERRED EMBODIMENT

Poly (ethyleneoxide), HO—$CH_2$ $CH_2$(O—$CH_2$ $CH_2)_n$OH (average molecular weight of $4\times10^6$, dried at 50° C. under vacuum overnight) and lithium trifluoromethanesulfonate ($LiCF_3SO_3$, dried at 100° C. under vacuum) in molar ratios of 20:1, respectively, are dissolved in acetonitrile (distilled under a stream of dry argon) with stirring in an argon-filled glove box containing less than 10 ppm water vapor. A second solution is prepared with bis(2 ethylhexyl) sebacate to yield a molar ratio of 20:1:1. Films are cast by pouring the solutions into flat teflon dishes. After allowing the solvent to completely evaporate, free-standing films (50 to 100 μm thick) are peeled from the dishes. Films are placed between stainless steel blocking electrodes and conductivities are calculated using ac impedance measurements taken from 5 Hz to 100 kHz with an EG&G PAR Model 388 Electrochemical Impedance System.

Figure 1:
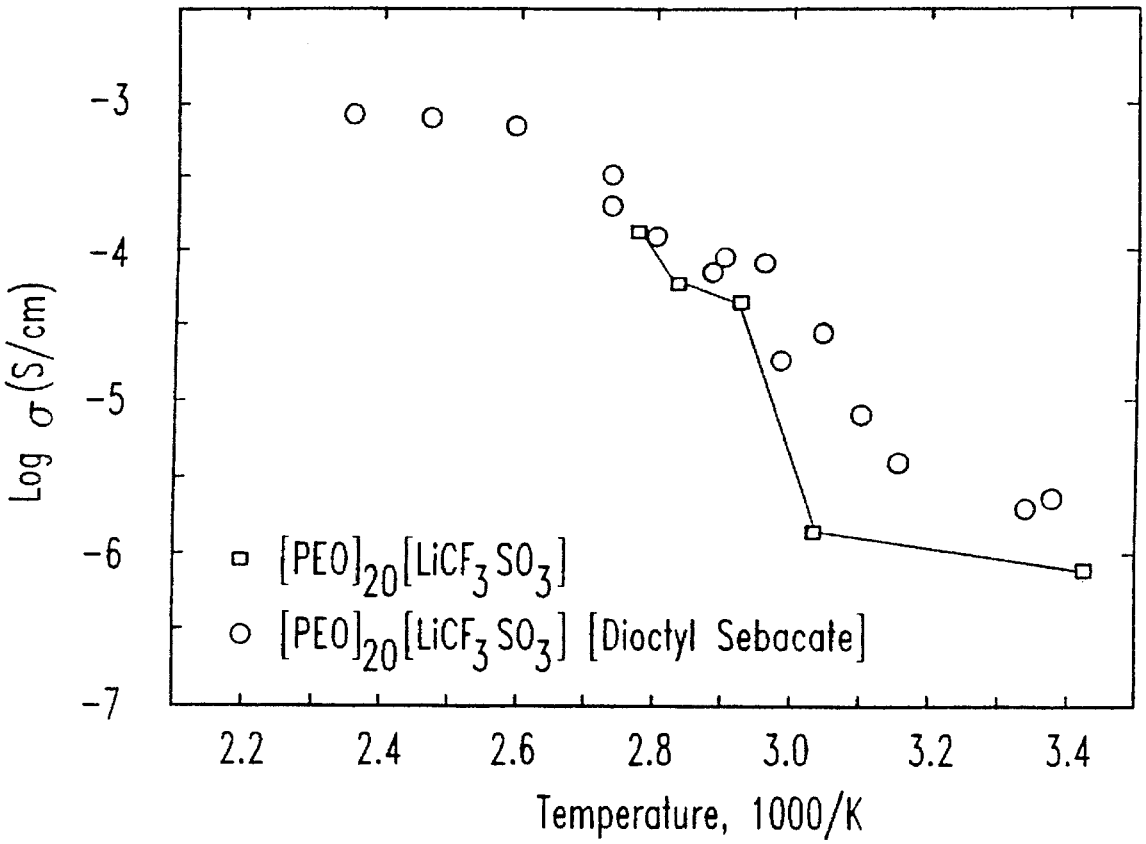
FIG. 1 shows the Log Conductivity vs. Temperature for the First Temperature Cycle for films of $[PEO]_{20}$ $[LiCF_3SO_3]\pm$ [Dioctyl Sebacate].

The ionic conductivity of films containing bis(2 ethylhexyl) sebacate is significantly higher at temperatures below $T_m$ compared to films without the additive as shown in FIG. 1 (the plasticized PEO data is for more than one film). It appears that conductivity is enhanced slightly at temperatures above $T_m$ as well. This renders the film more practical for use in an electrochemical cell since batteries are ordinarily used at room temperature. Further improvements by the addition of other salts or plasticizers and refinements in the molar ratios used may produce films with even higher conductivities.

Figure 2:
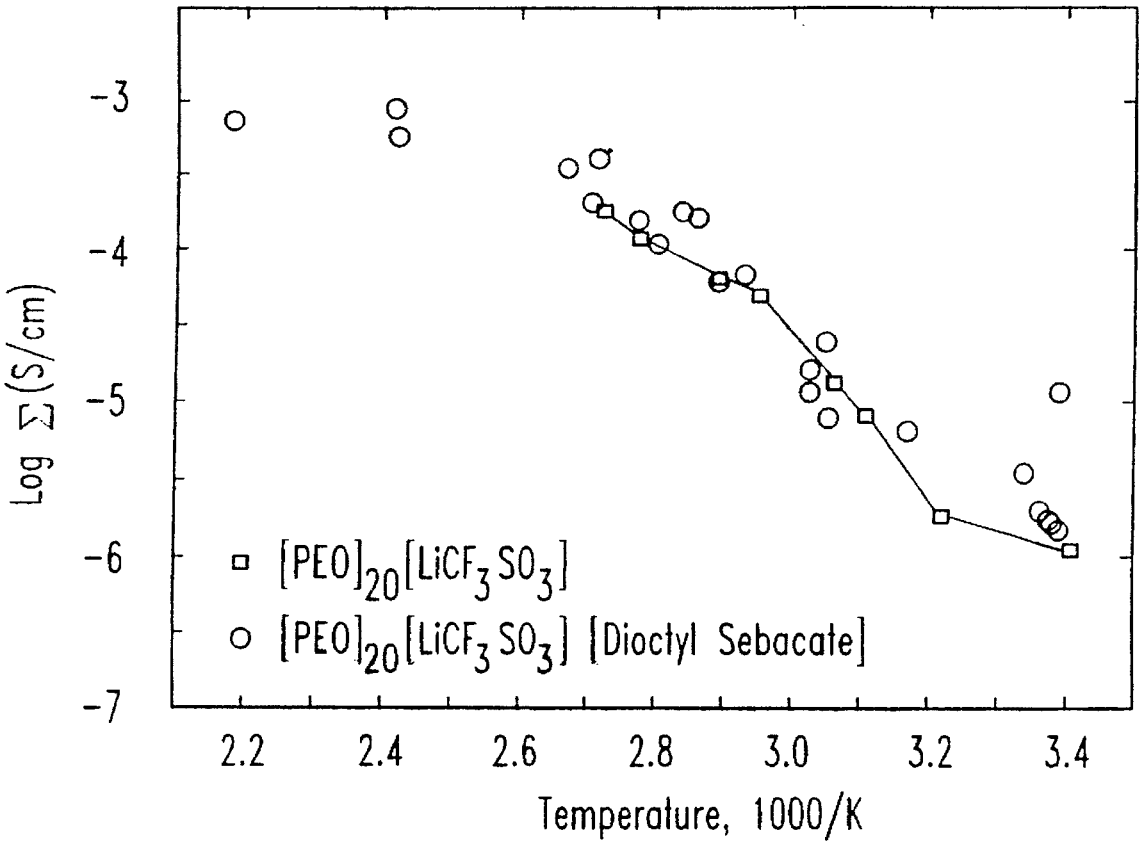
FIG. 2 shows the Log Conductivity vs. Temperature Subsequent to the First Temperature Cycle for films of $[PEO]_{20}$ $[LiCF_3SO_3]$ ± [Dioctyl Sebacate].

FIG. 2 shows conductivity vs temperature for temperature cycles subsequent to the first cycle. Plasticized films maintain comparable or better conductivity than un-plasticized films. In films containing dioctyl sebacate, conductivity for first (temperature) cycle and subsequent cycles are indistinguishable.

Since $Li^+$ associates with oxygen molecules on PEO, it is possible that bis(2 ethylhexyl) sebacate performs a dual role, increasing the amorphous nature of PEO and also complexing/coordinating lithium ions with the oxygen molecules on itself. Other substances of similar configurations might also be expected to be useful in augmenting ionic conductivity.

In lieu of poly(ethylene oxide) as the polymer host, one may use at least one of the following, poly(propylene oxide) and mixtures of poly(ethylene oxide) and poly(propylene oxide).

Similarly, other plasticizing agents may be used in the invention such as $LiN(CF_3SO_2)_2$, propylene carbonate-ethylene carbonate mixtures, triethylene glycol dimetharylate, and esters of phthalic, adipic, and phosphoric acids.

Though the preferred embodiment shows a molar ratio of PEO:salt:plasticizer of 20:1:1, alternate ratios may be used to optimize performance characteristics.

The anode of an electrochemical cell including the solid polymer electrolyte and plasticizer may be either lithium, a lithium alloy, or a lithium intercalate such as $LiC_6$, graphite, or petroleum coke. The cathode may be a metal oxide such as $Ag_2CrO_4$, CuO, $Bi_2O_3$, $Bi_2Pb_2O_5$, $CrO_x$, $MnO_2$, $Li_xMnO_y$, $MoO_3$, $MoO_3$, $LiNiO_2$, $V_2O_5$, $V_6O_{13}$, $LiCoO_2$ or sulfide such as CuS, $FeS_x$, $TiS_2$, $MoS_2$, $Cr_xV_{1-x}S_2$, $Ni_3S_2$, or fluoride such as $CuF_2$ $(CF)_n$ or chloride such as $CuCl_2$, AgCl or acetylene black carbon, or lithium intercalating compound, or electrically conductive polymer such as polyacetylene, poly (alkyl-thiophene), polyaniline, phenylene, phenylene sulfide, or mixtures thereof; including a solid polymer electrolyte. The electrochemical cell containing such an anode, solid polymer electrolyte containing plasticizer, and cathode may be primary (nonrechargeable) or secondary (rechargeable).

I wish it to be understood that I do not desire to be limited to the exact details of construction shown and described for obvious modification will occur to a person skilled in the art.

What is claimed is:

1. A solid polymer electrolyte including a solution of at least one lithium salt in at least one polymer host, and wherein said electrolyte includes a plasticizing agent.

2. A solid polymer electrolyte according to claim 1 wherein said polymer host is at least one polymer selected from the group consisting of poly(ethylene oxide) (PEO), polyacetylene, poly(alkyl-thiophene), polyaniline, phenylene, and phenylene sulfide, wherein said lithium salt is at least one salt selected from the group consisting of $LiClO_4$, $LiBF_4$, $LiCF_3SO_3$, and LiAs $F_6$ and wherein said plasticizing agent is selected from the group consisting of bis(2 ethylhexyl) sebacate, mixtures of propylene carbonate and ethylene carbonate, triethylene glycol dimethacrylate, esters of phthalic acid, esters of adipic acid, and esters of phosphoric acid.

3. A solid polymer electrolyte according to claim 2 wherein said polymer host is poly(ethylene oxide), said lithium salt is $LiCF_3SO_3$, and said plasticizing agent is bis(2 ethylhexyl ) sebacate.

4. A solid polymer electrolyte according to claim 3 wherein the ratio by weight of poly(ethylene oxide):$LiCF_3SO_3$: bis(2 ethylhexyl sebacate) is 20:1:1.

5. An electrochemical cell including an anode selected from the group consisting of lithium metal, lithium alloy, $LiC_6$, graphite, and petroleum coke, a cathode selected from the group consisting of $Ag_2CrO_4$, CuO, $Bi_2O_3$, $Bi_2Pb_2O_5$, $CrO_x$, $MnO_2$, $Li_xMnO_y$, $MoO_3$, $LiNiO_2$, $V_2O_5$, $V_6O_{13}$, $LiCoO_2$, CuS, $FeS_2$, $TiS_2$, $MoS_2$, $Cr_xV_{1-x}$, $S_2$, $Ni_3S_2$, $CuF_2$, $(CF)_n$, $CuCl_2$, and AgCl and a solid polymer electrolyte including a solid solution of at least one lithium salt in at least one polymer host, and said electrolyte including a plasticizing agent.

6. An electrochemical cell according to claim 5 wherein the solid polymer electrolyte includes a solid solution of $LiCF_3CO_3$ in poly(ethylene oxide); the solid polymer electrolyte also including bis(2 ethylhexyl) sebacate.

7. A rechargeable electrochemical cell according to claim 6 wherein the polymer is poly(ethylene oxides), wherein the salt is $LiCF_3SO_3$, and wherein the plasticizing agent is bis(2 ethylhexyl) sebacate.

8. An electrochemical cell according to claim 6 wherein the cell is a rechargeable cell.

9. An electrochemical cell according to claim 7 wherein the cell is a primary cell.

* * * * *